(12) United States Patent
Washiro (10) Patent No.: US 8,998,086 B2
(45) Date of Patent: Apr. 7, 2015

(54) MANAGEMENT DEVICE AND MANAGEMENT METHOD

(71) Applicant: Sony Corporation, Tokyo (JP)

(72) Inventor: Takanori Washiro, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/050,777

(22) Filed: Oct. 10, 2013

(65) Prior Publication Data

US 2014/0103113 A1   Apr. 17, 2014

(30) Foreign Application Priority Data

Oct. 17, 2012   (JP) ................................. 2012-229644

(51) Int. Cl.
  *G06K 7/00*   (2006.01)
  *G06K 7/10*   (2006.01)
  *G06K 17/00*  (2006.01)

(52) U.S. Cl.
  CPC .... *G06K 7/10356* (2013.01); *G06K 2017/0051* (2013.01)

(58) Field of Classification Search
  CPC . G06K 7/10; G06K 7/10356; G06K 7/10316; G06K 7/10019; G06K 2017/0051; G06K 19/07767

USPC .............................. 235/439, 440, 435, 472.02
  See application file for complete search history.

(56) References Cited

U.S. PATENT DOCUMENTS

| | | | |
|---|---|---|---|
| 6,365,828 B1 * | 4/2002 | Kinoshita et al. ............. | 174/359 |
| 2004/0217867 A1 * | 11/2004 | Bridgelall et al. ......... | 340/572.8 |
| 2005/0280512 A1 * | 12/2005 | Forster ....................... | 340/10.34 |
| 2006/0244601 A1 * | 11/2006 | Nishimura ................. | 340/572.4 |
| 2007/0279191 A1 * | 12/2007 | Yamamoto et al. ......... | 340/10.1 |
| 2009/0303004 A1 * | 12/2009 | Tuttle ............................ | 340/10.1 |
| 2010/0013602 A1 * | 1/2010 | Hoyt et al. .................... | 340/10.1 |
| 2010/0290315 A1 * | 11/2010 | Eisen et al. .................... | 367/111 |

FOREIGN PATENT DOCUMENTS

JP   2006-246372 A   9/2006

* cited by examiner

*Primary Examiner* — Edwyn Labaze (74) *Attorney, Agent, or Firm* — Wolf, Greenfield & Sacks, P.C.

(57) ABSTRACT

There is provided a management device including a position identification unit that identifies, based on identification information that is acquired from a plurality of antennas, a plurality of terminals, or antennas and terminals and indicates an object, a position of the object that stores the identification information. A distance between the antennas, a distance between the terminals, or a distance between the antennas and the terminals is a distance at which no mutual interference occurs.

20 Claims, 5 Drawing Sheets

MANAGEMENT DEVICE AND MANAGEMENT METHOD

BACKGROUND

The present disclosure relates to a management device and a management method.

Technologies which aim to increase the degree of freedom of the positional relationship between an RFID (Radio Frequency Identification) tag and an RFID reader that can read data from the RFID tag by performing communication with the RFID tag in a non-contact manner have been developed. As one of the technologies described above, the technology disclosed in, for example, Japanese Unexamined Patent Application Publication No. 2006-246372 is exemplified.

SUMMARY

In inventory management or clearance of a warehouse performed through visual checking or reading of bar codes, for example, workers have to check target articles one by one, and thus it takes time and effort. In such a case, when a wireless communication technology such as a communication technology based on NFC (Near Field Communication) or the RFID (Radio Frequency Identification) technology as disclosed in Japanese Unexamined Patent Application Publication No. 2006-246372 is used, for example, it is possible to collectively read identification information (for example, data such as IDs that indicate articles) of articles placed over a wide range.

However, when an article of which identification information is to be read (for example, an article that is subject to inventory management or clearance of a warehouse) is covered with metal, or placed in the shadow of other articles, for example, there is concern that it is difficult to read the identification information of the article that is supposed to be read even when the wireless communication technology as described above is used.

In addition, if the output of a reader-writer (a device on the side actively transmitting carrier waves; the same applies hereinafter) is elevated, the possibility of reading of identification information of articles that is supposed to be read failing can be lowered.

When the output of a reader-writer is elevated, however, identification information of articles placed over a wide range is read. For this reason, in such a case, even if the approximate position of an article of which identification information is to be read is assumed to be known, it is difficult to identify the position of the article.

In addition, when the output of the reader-writer is elevated, carrier waves are transmitted in a wide range, and thus there is concern of occurrence of a null point (dead point) at which it is difficult to read identification information of an article to be read due to interference of a reflected wave reflected from a wall, or the like. Thus, since it is difficult to stably read identification information of an article to be read in such a case, the position of the article can be difficult to identify.

It is desirable to propose a novel and improved management device and management method that can identify the position of an object that is a target of specification of the position.

According to an embodiment of the present disclosure, there is provided a management device including a position identification unit that identifies, based on identification information that is acquired from a plurality of antennas, a plurality of terminals, or antennas and terminals and indicates an object, a position of the object that stores the identification information. A distance between the antennas, a distance between the terminals, or a distance between the antennas and the terminals is a distance at which no mutual interference occurs.

Further, according to an embodiment of the present disclosure, there is provided a management method including identifying, based on identification information that is acquired from a plurality of antennas, a plurality of terminals, or antennas and terminals and indicates an object, a position of the object that stores the identification information. A distance between the antennas, a distance between the terminals, or a distance between the antennas and the terminals is a distance at which no mutual interference occurs.

According to an embodiment of the present technology, it is possible to identify the position of an object that is a target of specification of the position.

DETAILED DESCRIPTION OF THE EMBODIMENT(S)

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, hereinafter, description will be provided in the following order.

1. A management method according to an embodiment
2. An example of an object according to the embodiment to which the management method according to the embodiment is applied
3. A management device according to the embodiment
4. A program according to the embodiment (A Management Method According to an Embodiment)

Prior to describing a configuration of a management device according to an embodiment, first of all, a management method according to the present embodiment will be described. Hereinafter, the management method according to the present embodiment will be described exemplifying a case in which the management device according to the present embodiment performs a process of the management method according to the present embodiment.

As described above, when identification information is acquired from an object (which is a target of specification of the position; may be referred to hereinafter as an "object O") in which the identification information is stored using the wireless communication technology such as the communication technology based on NFC, or the RFID technology, the identification information may not be able to be read from the object O. Thus, in such a case, it is not difficult to identify the position of the object O at all times.

The management device according to the present embodiment identifies the position of the object O based on identification information acquired from a plurality of antennas, a plurality of terminals, or antennas and terminals (position specification process). Here, the identification information according to the present embodiment refers to data indicating the object (data with which the object can be identified). As the identification information according to the present embodiment, for example, data indicating an ID (identifier) is exemplified.

To be more specific, the management device according to the present embodiment identifies the position of an article corresponding to the identification information using, for example, the positions of the antennas or the terminals with which the identification information is acquired. The acquisition of the identification information according to the present embodiment is achieved in such a way that, for example, a communication unit (to be described later) included in the management device according to the present embodiment transmits a transmission request for transmitting the identification information via the antennas and/or the terminals, and receives the identification information according to the transmission request from the antennas and/or the terminals. Note that the transmission of the transmission request according to the present embodiment may be performed by an external device having the same function as the communication unit (to be described later).

Here, "the distance between antennas," "the distance between terminals," and "the distance between antennas and terminals" according to the present embodiment refer to distances in which interference does not occur. In other words, each piece of identification information used by the management device according to the present embodiment for identifying positions corresponds to the positions of the antennas or terminals one by one. Note that an example of disposition of the antennas and the terminals according to the present embodiment will be described later.

Thus, the management device according to the present embodiment can identify the position of an article corresponding to the identification information based on the positions of the antennas or the terminals through which the identification information is acquired by performing the position specification process according to the present embodiment. Therefore, the management device according to the present embodiment can identify the position of the object O that is a target of specification of the position.

(An Example of the Object O According to the Present Embodiment to which the Management Method According to the Present Embodiment is Applied)

As described above, the management device according to the present embodiment can identify the position of the object O that is a target of specification of the position by, for example, performing the position specification process according to the present embodiment. Next, an example of the object O according to the present embodiment to which the management method according to the present embodiment is applied will be described.

Here, as the object O according to the present embodiment, for example, articles that are subject to inventory management or clearance of a warehouse, articles stored in a warehouse, or the like are exemplified. Note that the object O according to the present embodiment is not limited to the examples. The object O according to the present embodiment may be, for example, a container (for example, a box, a basket, a rack, a beer case, or the like) that can contain another object such as an article that is subject to inventory management or clearance of a warehouse.

In addition, the shape of the object O according to the present embodiment may vary, for example, may be a cuboid shape, a prismatic column shape, and the like. Hereinafter, a case in which the object O according to the present embodiment has a cuboid shape will be exemplified. Note that the shape of the object O according to the present embodiment is not limited thereto. For example, on the object O according to the present embodiment, legs for fixing the position of the object in the position in which the antennas or the terminals may be disposed, or a connection member for connecting the object to other articles may be provided. For example, by providing legs for fixing the position of the object O in the position of the object O in which the antennas or the terminals according to the present embodiment are disposed, position matching with the position in which the antennas or the terminals are disposed becomes easy. In addition, by providing the connection member for connecting the object O to other articles, connection to the articles can be ensured.

When the existing wireless communication technology such as the communication technology based on NFC or the RFID technology is used, for example, communication is conducted through an invisible communication path formed by a magnetic field (carrier wave) of a predetermined frequency, for example, 13.56 MHz. In other words, a human being is not able to identify a path through which a signal is transmitted by a carrier wave, or a communicable region. Thus, when a position is identified based on identification information acquired using the existing wireless communication technology, the result of the specification of the position may not be fully reliable.

Thus, the object O according to the present embodiment, for example, confines a signal such as a signal indicating a transmission request transmitted from the communication unit (to be described later) included in the management device according to the present embodiment or from an external device having the same function as the communication unit (to be described later), or a signal indicating identification information within a transmission line so as to limit a route in which the signal is transmitted. With the limitation on the route in which the signal is transmitted imposed by the object O according to the present embodiment as described above, for example, the management device according to the present embodiment can acquire identification information from the object O corresponding to the antennas and/or the terminals, i.e., the object O of which identification information is supposed to be acquired, more reliably than before.

Thus, with the limitation on the route in which the signal is transmitted imposed by the object O according to the present embodiment as described above, for example, the management device according to the present embodiment can identify the position of the object that is a target of specification of the position more reliably than before. In addition, with the limitation on the route in which the signal is transmitted imposed by the object O according to the present embodiment as described above, it is possible to ensure a user who finds the result of the specification of the position.

Figure 1:
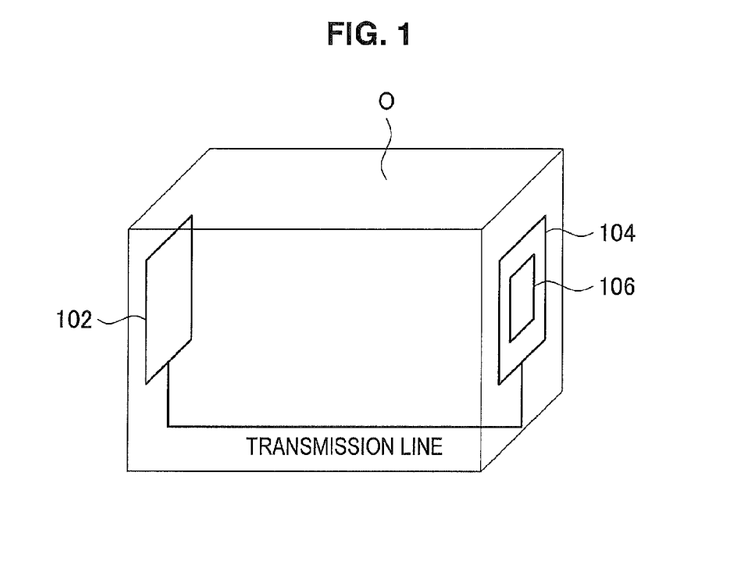
FIG. 1 is a descriptive diagram illustrating a first example of a configuration of an object according to an embodiment of the present technology.

[2-1] First Example of a Configuration of the Object O According to the Present Embodiment FIG. 1 is a descriptive diagram illustrating a first example of a configuration of the object O according to the present embodiment. The object O according to the first example includes, for example, a first antenna 102, a second antenna 104, a transmission line, and a processing unit 106.

The first antenna 102 and the second antenna 104 each perform transmission and reception of signals in a non-contact manner. An example of a configuration of each of the first antenna 102 and the second antenna 104 will be described later.

The transmission line connects the first antenna 102 to the second antenna 104. In other words, when the first antenna 102 receives a signal, the first antenna 102 transfers the received signal to the second antenna 104, and the second antenna 104 transmits the transferred signal. In addition, when the second antenna 104 receives the signal, the second antenna 104 transfers the received signal to the first antenna 102, and the first antenna 102 transmits the transferred signal.

The processing unit 106 stores identification information. In addition, the processing unit 106 transmits the identification information to the second antenna 104 when a transmission request transmitted from the second antenna 104 is received.

Here, the processing unit 106 transmits the stored identification information to the second antenna 104 by conducting communication with the second antenna 104 in a non-contact manner using, for example, wireless communication based on NFC or RFID. To be specific, the processing unit 106 is driven by obtaining electric power from a signal transferred from the second antenna 104 and then transmits identification information through load modulation according to the transmission request included in the received signal. As the processing unit 106, for example, an RFID tag or an IC (Integrated Circuit) chip is exemplified, however, the processing unit 106 is not limited thereto.

Figure 2:
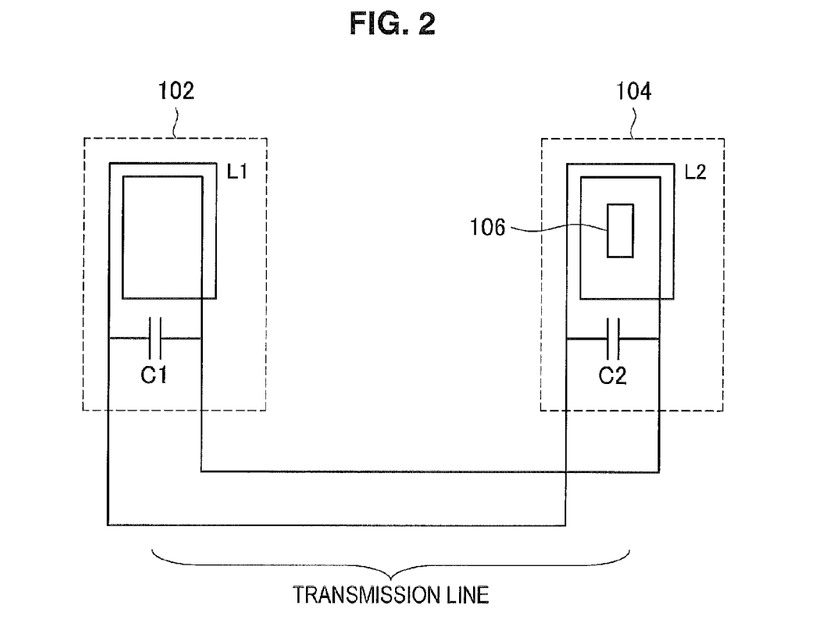
FIG. 2 is a descriptive diagram illustrating an example of a first antenna, a second antenna, a transmission line, and a processing unit constituting the object according to the first example of the embodiment.

FIG. 2 is a descriptive diagram illustrating an example of the first antenna 102, the second antenna 104, the transmission line, and the processing unit 106 constituting the object O according to the first example of the present embodiment.

The first antenna 102 is configured with a resonance circuit that includes, for example, a coil (inductor) L1 having a predetermined inductance and a capacitor C1 having a predetermined electrostatic capacitance. Here, a resonance frequency of the first antenna 102 is set to be an NFC- or RFID-based communication frequency, for example, 13.56 MHz, or the like.

The second antenna 104 is configured with a resonance circuit that includes, for example a coil L2 having a predetermined inductance and a capacitor C2 having a predetermined electrostatic capacitance. Here, a resonance frequency of the second antenna 104 is set to be an NFC- or RFID-based communication frequency, for example, 13.56 MHz, or the like, as in the first antenna 102. In addition, the processing unit 106 in, for example, the RFID scheme is attached to the inner side of the coil L2 of the second antenna 104.

The transmission line is formed by connecting the first antenna 102 and the second antenna 104 with two conductive wires. As the two conductive wires of the transmission line, for example, wires of which the interval is narrow, or "stranded wires," are exemplified. As described above, by setting the two conductive wires to be wires of which the interval is narrow, or "stranded wires," interference caused by intrusion of electromagnetic waves from outside can be reduced.

The first antenna 102, the second antenna 104, the transmission line, and the processing unit 106 constituting the object O according to the present embodiment illustrated in FIG. 1 have the configuration as illustrated in, for example, FIG. 2. Note that it is needless to say that the configurations of the constituent elements of the object O according to the present embodiment are not limited to those illustrated in FIG. 2.

The transmission line illustrated in FIG. 2 is buried in the object O according to the present embodiment, and a signal indicating a transmission request, identification information, or the like is transmitted along the transmission line.

In addition, by being provided with the first antenna 102 and the second antenna 104 constituting the resonance circuit as illustrated in, for example, FIG. 2, the object O according to the present embodiment conducts communication with the communication unit (to be described later) included in the management device according to the present embodiment, an external device having the same function as the communication unit (to be described later), or another object O according to the present embodiment in a non-contact manner. Here, with regard to the object O according to the present embodiment, gains of the antennas are adjusted so as not to allow, for example, the antennas, which are positioned apart, to directly transmit and receive signals without passing through the transmission line, and to set the communicable distance between the antennas to be about several centimeters. In addition, the communication unit (to be described later) included in the management device according to the present embodiment or an external device having the same function as the communication unit (to be described later) adjusts transmission output of signals such as a transmission request so as not to allow, for example, the antennas, which are positioned apart, to directly transmit and receive the signals without passing through the transmission line.

With the configuration of the object O according to the present embodiment as illustrated in FIG. 1, for example, a signal transmitted from the communication unit (to be described later) included in the management device according to the present embodiment or an external device having the same function as the communication unit (to be described later) can be transferred to a plurality of objects O according to the present embodiment via the first antenna 102 and the second antenna 104 included in each of them. Thus, with the configuration of the object O according to the present embodiment as illustrated in FIG. 1, for example, the management device according to the present embodiment can identify the position of each object O (each object that is a target of specification of the position) based on identification information acquired from each of the plurality of objects O according to the present embodiment.

In addition, with regard to the object O according to the first example of the present embodiment, by transmitting signals on a wired transmission line, various signals such as a signal indicating a transmission request and a signal indicating identification information can be reliably transmitted only to destinations of the transmission. Therefore, with the configuration of the object O according to the present embodiment as illustrated in FIG. 1, for example, an acquirable range of identification information can be expanded, and reliability of the result of specification of the position based on acquired identification information can be enhanced.

Figure 3:
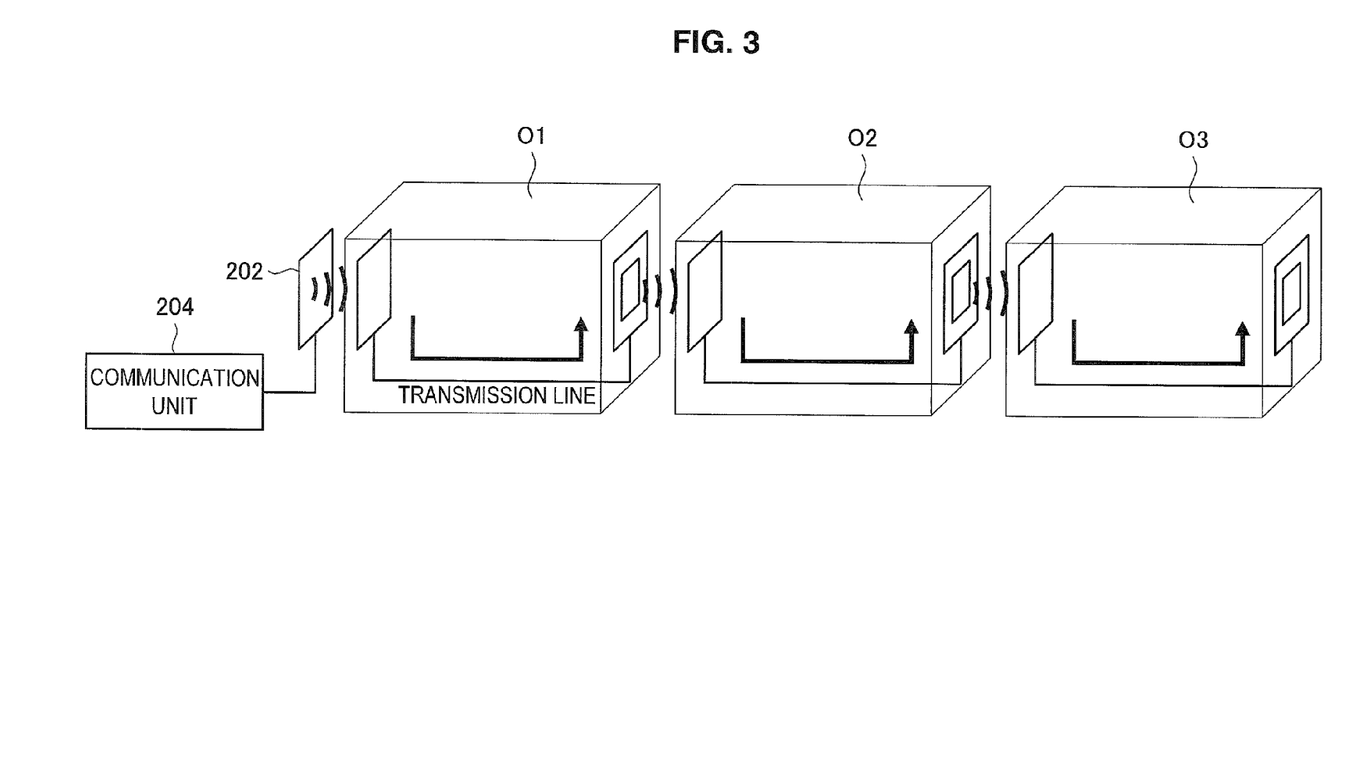
FIG. 3 is a descriptive diagram illustrating an example of a state in which a signal is transmitted among a plurality of objects according to the embodiment.

FIG. 3 is a descriptive diagram illustrating an example of a state in which a signal is transmitted among a plurality of objects O according to the present embodiment. Here, FIG. 3 shows an example in which an object O1 according to the present embodiment and an object O2 according to the present embodiment are arranged adjacent to each other, and the object O2 according to the present embodiment and an object O3 according to the present embodiment are arranged adjacent to each other. In addition, FIG. 3 shows an example in which a signal transmitted from a communication unit 204 included in the management device according to the present embodiment is transferred to the object O1 via an antenna 202.

As illustrated in FIG. 3, for example, when an antenna (for example, corresponding to the first antenna 102 illustrated in FIG. 1) at one end of the object O1 according to the present embodiment receives a signal transmitted from the communication unit 204, the signal is transmitted from another antenna (for example, corresponding to the second antenna 104 illustrated in FIG. 1) at the other end of the object O1 via a transmission line. In addition, when an antenna (for example, corresponding to the first antenna 102 illustrated in FIG. 1) at one end of the object O2 according to the present embodiment receives the signal transmitted from the object O1 according to the present embodiment, the signal is transmitted from another antenna (for example, corresponding to the second antenna 104 illustrated in FIG. 1) at the other end of the object O2 via a transmission line. Then, when an antenna (for example, corresponding to the first antenna 102 illustrated in FIG. 1) at one end of the object O3 according to the present embodiment receives the signal transmitted from the object O2 according to the present embodiment, the signal is transmitted from another antenna (for example, corresponding to the second antenna 104 illustrated in FIG. 1) at the other end of the object O3 via a transmission line.

Thus, as illustrated in FIG. 3, for example, the signal transmitted from the communication unit 204 is transferred in succession through the first antenna 102, the second antenna 104 and the transmission line included in each of the objects O according to the present embodiment.

In addition, the processing unit 106 included in each of the objects O according to the present embodiment transmits identification information according to a received processing command. Then, the identification information transmitted from the processing unit 106 is transferred to the first antenna 102, the second antenna 104, and the transmission line included in each of the objects O according to the present embodiment in succession, and then received by the communication unit 204. Accordingly, the management device according to the present embodiment can identify the position of each of the objects O1 to O3 (objects which are targets of the specification of the position) illustrated in FIG. 3 based on the identification information acquired by the communication unit 204 from the reception.

Figure 4:
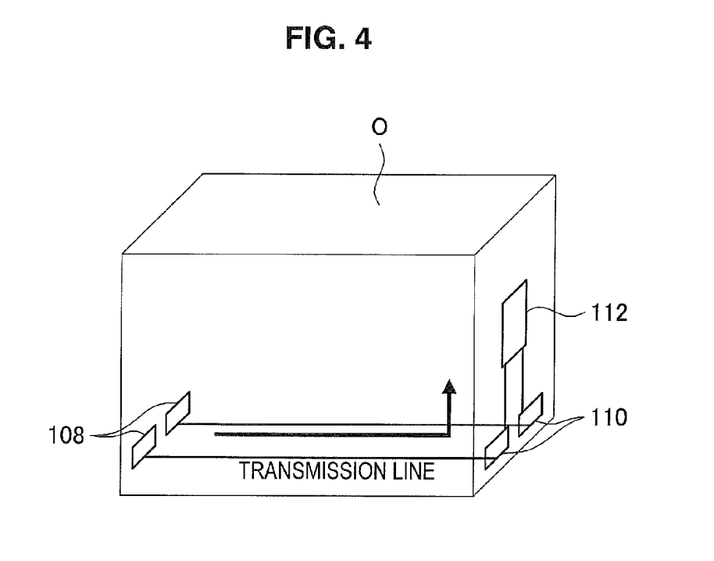
FIG. 4 is a descriptive diagram illustrating a second example of the configuration of the object according to the embodiment.

[2-2] Second Example of the Configuration of the Object O According to the Present Embodiment FIG. 4 is a descriptive diagram illustrating a second example of the configuration of the object O according to the present embodiment. The object O according to the second example includes, for example, first terminals 108, second terminals 110, a transmission line, and a processing unit 112.

The first terminals 108 and the second terminals 110 each perform transmission and reception of signals in a contact manner. As the first terminals 108 and the second terminals 110, for example, a conductive member such as an electrode or metal is used.

The transmission line connects the first terminals 108 and the second terminals 110. In other words, when the first terminal 108 receives a signal, the first terminal 108 transfers the received signal to the second terminal 110, and the second terminal 110 transmits the transferred signal to another terminal, or the like connected thereto. In addition, when the second terminal 110 receives a signal, the second terminal 110 transfers the received signal to the first terminal 108, and the first terminal 108 transmits the transferred signal.

The processing unit 112 stores identification information as the processing unit 106 according to the first example illustrated in FIG. 1. In addition, the processing unit 112 is electrically connected to the transmission line, and when a transmission request is transferred from the connected transmission line, the processing unit transmits the identification information to the transmission line. Here, as the processing unit 112, for example, an RFID tag or an IC chip is used, however, the processing unit 112 is not limited thereto.

Also when the object O according to the present embodiment has the configuration as illustrated in FIG. 4, for example, a signal transmitted from the communication unit included in the management device according to the present embodiment or an external device having the same function as the communication unit can be transferred to a plurality of objects O according to the present embodiment via the first terminal 108 and the second terminal 110 included in each of the objects, in the same manner as the case in which the object O according to the present embodiment has the configuration illustrated in FIG. 1. Thus, in the same manner as the case in which the object O according to the present embodiment has the configuration according to the first example illustrated in FIG. 1, with the configuration of the object O according to the present embodiment illustrated in, for example, FIG. 4, the management device according to the present embodiment can identify the position of each of the objects O (each of the objects which are targets of specification of the position) based on the identification information acquired from each of the plurality of objects O according to the present embodiment.

In addition, since a signal is transmitted on a wired transmission line in the object O according to the second example of the present embodiment, various signals such as signals indicating a transmission request or signals indicating identification information can be reliably transmitted only to destinations of the transmission, in the same manner as in the object O according to the first example illustrated in FIG. 1. Thus, with the configuration of the object O according to the present embodiment as illustrated in, for example, FIG. 4, the acquisition-possible range of the identification information can be expanded, and reliability of the result of the specification of the position based on the acquired identification information can be enhanced, as in the case in which the object O according to the present embodiment has the configuration according to the first example illustrated in FIG. 1.

In addition, even when the object O according to the present embodiment has the configuration illustrated in, for example, FIG. 4, with the arrangement of the plurality of objects O according to the second example adjacent to each other in the state in which the terminals come into contact with each other, a signal transmitted from the communication unit included in the management device according to the present embodiment or an external device having the same function as the communication unit is transmitted in succession via the first terminals 108, the second terminals 110, and the transmission lines included in each object O according to the present embodiment in the same manner as in, for example, the example illustrated in FIG. 3.

In addition, the processing unit 112 included in each of the objects O according to the present embodiment transmits identification information according to a processing command transferred from the transmission line. Then, the identification information transmitted from the processing unit 112 is transmitted in succession via the first terminals 108, the second terminals 110, and the transmission lines included in each of the objects O according to the present embodiment, and received by the communication unit included in the management device according to the present embodiment or an external device having the same function as the communication unit. Accordingly, the management device according to the present embodiment can identify the position of each of the plurality of objects O (objects whose positions are to be identified) based on the identification information received and acquired from the communication unit included in the management device according to the present embodiment or the external device having the same function as the communication unit.

[2-3] Third Example of the Configuration of the Object O According to the Present Embodiment The configuration of the object O according to the present embodiment is not limited to those according to the first example and the second example described above. In the first example illustrated in FIG. 1 and the second example illustrated in FIG. 4, for example, the case in which the transmission line is provided in a uniaxial direction of the object O according to the present embodiment has been introduced, however, transmission lines may be provided in multi-axial directions in the object O according to the present embodiment.

Figure 5:
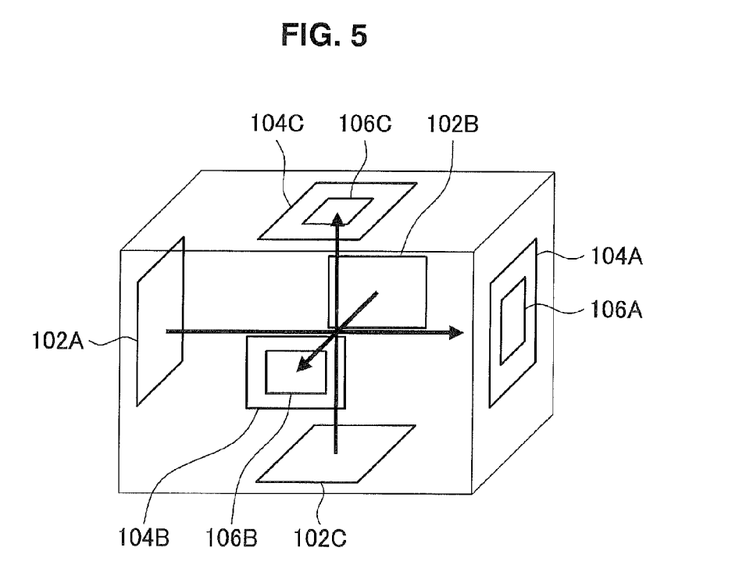
FIG. 5 is a descriptive diagram illustrating a third example of the configuration of the object according to the embodiment.

FIG. 5 is a descriptive diagram illustrating a third example of the configuration of the object O according to the present embodiment. Here, FIG. 5 illustrates an example of a configuration having the function of conducting communication in a non-contact manner as in the first example illustrated in FIG. 1, in which transmission lines are provided in three axial directions. Note that, in FIG. 5, the transmission lines are omitted for the sake of convenience, and signals transmitted on the transmission lines will be indicated by arrows.

An object O according to the third example includes, for example, a first antenna 102A and a second antenna 104A corresponding to a first axis, a first antenna 102B and a second antenna 104B corresponding to a second axis, and a first antenna 102C and a second antenna 104C corresponding to a third axis.

A signal that the first antenna 102A receives is transferred to the second antenna 104A via a transmission line, and the signal is transmitted again from the second antenna 104A. In addition, a signal that the first antenna 102B receives is transferred to the second antenna 104B via a transmission line, and the signal is transmitted again from the second antenna 104B. In addition, a signal that the first antenna 102C receives is transferred to the second antenna 104C via a transmission line, and the signal is transmitted again from the second antenna 104C. In other words, in the object O according to the third example illustrated in FIG. 5, transmission, reception, and transfer of signals are performed on each axis in the same manner as in the object O according to the first example illustrated in FIG. 1.

Thus, even when the object O according to the present embodiment has the configuration illustrated in, for example, FIG. 5, a signal transmitted from the communication unit included in the management device according to the present embodiment or an external device having the same function as the communication unit can be transferred to a plurality of objects O according to the present embodiment via the first antennas 102 and the second antennas 104 included in each of the objects in the same manner as in the case in which the object O according to the present embodiment has the function illustrated in FIG. 1. Accordingly, with the configuration of the object O according to the present embodiment illustrated in, for example, FIG. 5, the management device according to the present embodiment can identify the position of each of the objects O (the position of each of which is to be identified) based on identification information acquired from each of the plurality of objects O according to the present embodiment in the same manner as in the case in which the object O according to the present embodiment has the configuration according to the first example illustrated in FIG. 1.

In addition, since signals are transmitted on wired transmission lines in the object O according to the third example of the present embodiment, various signals such as signals indicating a transmission request and signals indicating identification information can be reliably transmitted only to destinations of the transmission as in the object O according to the first example illustrated in FIG. 1. Thus, with the configuration of the object O according to the present embodiment illustrated in, for example, FIG. 5, the acquirable range of identification information can be expanded, and reliability of the result of specification of position can be enhanced based on acquired identification information as in the case in which the object O according to the present embodiment has the configuration according to the first example illustrated in FIG. 1.

In addition, even when the object O according to the present embodiment has the configuration illustrated in, for example, FIG. 5, in arrangement of the plurality of objects O according to the third example adjacent to each other in each axis in the same manner as in the example illustrated in FIG. 3, a signal transmitted from the communication unit included in the management device according to the present embodiment or an external device having the same function as the communication unit is transmitted in succession via the first antennas 102, the second antennas 104, and the transmission lines included in each of the objects O according to the present embodiment. Accordingly, the management device according to the present embodiment can identify the position of each of the plurality of objects O (objects whose positions are to be identified) based on identification information received and acquired from the communication unit included in the management device according to the present embodiment or an external device having the same function as the communication unit.

Note that the configuration of the object O according to the third example of the present embodiment is not limited to the example illustrated in FIG. 5. For example, the object O according to the third example of the present embodiment may be provided with transmission lines in a plurality of axial directions such as two, four, or more axial directions. In addition, FIG. 5 illustrates an example of a configuration with the function of conducting communication in a non-contact manner as in the first example illustrated in FIG. 1, however, the object O according to the third example according to the present embodiment may be configured to have a function of conducting communication in a contact manner as in the second example illustrated in FIG. 4.

[2-4] Another Example of the Configuration of the Object O According to the Present Embodiment The configuration of the object O according to the present embodiment is not limited to the configurations according to the first example to the third example described above. For example, the configuration of the object O according to the present embodiment may be the configuration in which antennas and terminals are included. To be specific, as the configuration of the object O according to another example of the present embodiment, for example, a "configuration in which the first antenna 102, the second terminal 110, the transmission line, and the processing unit 112 are included," a "configuration in which the first terminal 108, the second antenna 104, the transmission line, and the processing unit 112 are included," or a "configuration in which transmission lines are provided in a plurality of axial directions in any of the configurations (configuration corresponding to the third example described above)" is exemplified.

(Management Device According to the Present Embodiment)

Next, an example of a configuration of the management device according to the present embodiment that can perform a process according to the above-described management method according to the present embodiment will be described.

Figure 6:
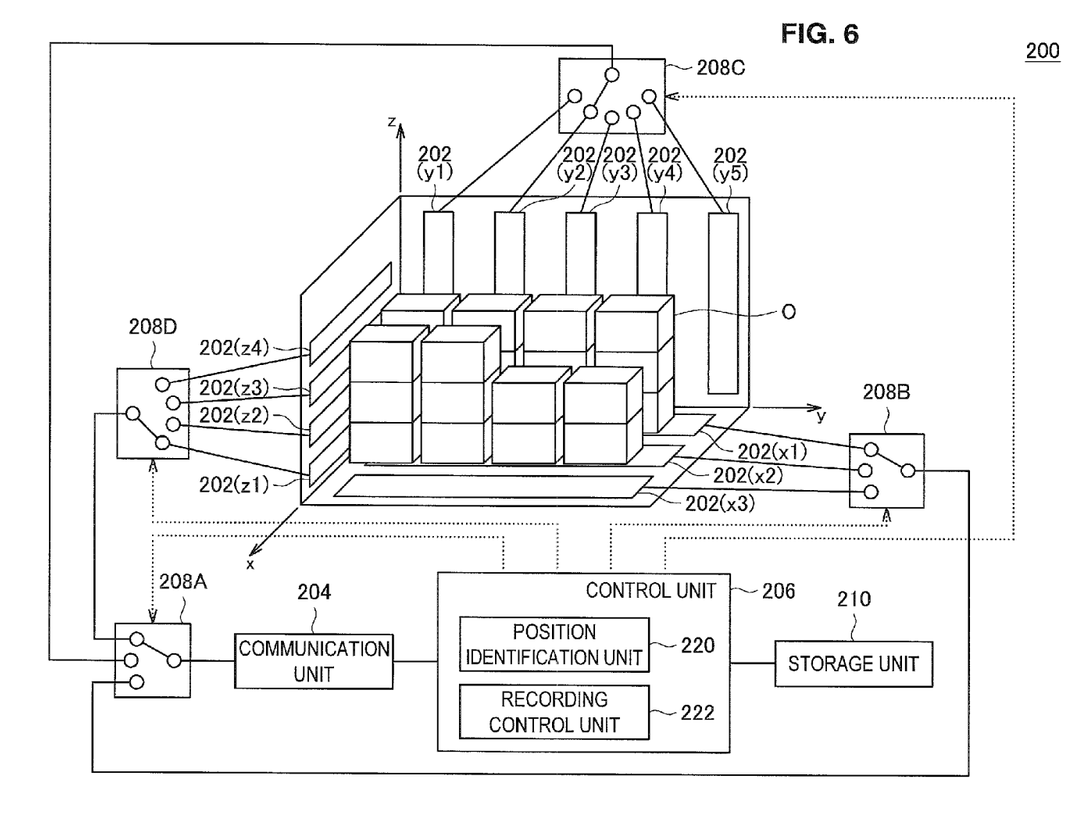
FIG. 6 is a block diagram illustrating an example of a configuration of a management device according to the embodiment.

FIG. 6 is a block diagram illustrating an example of a configuration of a management device 200 according to the present embodiment. The management device 200 includes a plurality of antennas 202, a communication unit 204, a control unit 206, switch units 208A to 208D (which may be collectively referred to hereinafter as a "switch unit 208"), and a storage unit 210. In addition, FIG. 6 also illustrates a plurality of objects O according to the present embodiment.

In addition, the management device 200 may include, for example, a ROM (Read Only Memory, not illustrated), a RAM (Random Access Memory, not illustrated), an operation unit that is operable by a user (not illustrated), a display unit that displays various screens thereon (not illustrated), and the like. The management device 200 connects each of the constituent elements described above with each other using, for example, a bus as a transmission line of data.

The ROM (not illustrated) stores, for example, data for control such as programs and arithmetic operation parameters used by each unit such as the control unit 206. The RAM (not illustrated) temporarily stores, for example, programs executed by each unit such as the control unit, and the like.

The operation unit (not illustrated) is an operating section included in the management device 200. As the operation unit (not illustrated), for example, a rotary selector such as a button, a direction key, or a jog dial, or a combined unit thereof is exemplified.

The display unit (not illustrated) is a displaying section included in the management device 200. As the display unit (not illustrated), for example, a liquid crystal display, an organic EL display (organic Electroluminescence display, also called an OLED (Organic Light Emitting Diode) display), or the like is exemplified. Note that the display unit (not illustrated) may be a device, for example, a touch screen which enables display and user operations therewith.

Each of the plurality of antennas 202 performs transmission and reception of signals in a non-contact manner. Here, as signals transmitted and received by the antennas 202, for example, signals indicating transmission requests, signals indicating identification information, and the like are exemplified.

In addition, the antennas 202 are installed on, for example, a face in a direction in which gravity is applied to an object and on which the objects O are placed (face defined with the x axis and the y axis illustrated in FIG. 6, and hereinafter referred to as a "first face") as indicated by an antenna 202 (x1) to an antenna 202 (x3) of FIG. 6.

A signal which is transmitted from the communication unit 204 and then transferred to the antenna 202 (x1) to the antenna 202 (x3) installed on the first face (for example a signal indicating a transmission request, or the like) is transmitted in the vertical direction (the upper direction in FIG. 6) to the first face. In addition, signals transmitted from the objects O toward the antenna 202 (x1) to the antenna 202 (x3) (for example, signals indicating identification information, or the like) are transmitted in the vertical direction (the lower direction in FIG. 6) to the first face.

Here, since the first face is a face in the direction in which gravity is applied to the objects O, a state of the objects O placed on the first face is reliably realized to be in succession as illustrated in FIG. 3. Accordingly, with the installation of the antennas 202 on the first face, the management device 200 (to be more specific, a position specification unit 220 to be described later) can reliably identify the positions of the objects O placed on the first face.

In addition, the antennas 202 are installed on faces in the vertical direction to the first face (a face defined by the y axis and the z axis shown in FIG. 6, or a face defined by the x axis and the z axis shown in FIG. 6, which is hereinafter referred to as a "second face") indicated by, for example the antenna 202 (y1) to the antenna 202 (y5) or the antenna 202 (z1) to the antenna 202 (z4) of FIG. 6. Note that FIG. 6 illustrates an example in which the antennas 202 are installed on two second faces, however, the number of second faces on which the antennas 202 are installed is not limited to two. For example, the antennas 202 may be installed on one, or three or more second faces. In other words, the antennas 202 can be installed on, for example, one or two or more second faces in the vertical direction to the first face.

When a signal (for example, a signal indicating a transmission request, or the like) transmitted from the communication unit 204 is transferred to the antennas 202 installed on each of the first face and the second faces, the signal is transferred from the faces on which the antennas 202 are installed in the vertical direction thereto. In addition, when signals (for example, signals indicating identification information, or the like) transmitted from the objects O are transferred to the antennas 202 installed on each of the first face and the second faces, the signals are transmitted from the faces on which the antennas 202 are installed in the vertical direction thereto (the direction opposing the direction in which the signal transmitted from the communication unit 204 is transmitted).

Each of the plurality of antennas 202 performs transmission and reception of signals in a non-contact manner in the configuration illustrated in, for example FIG. 6. Note that the configuration of the plurality of antennas 202 according to the present embodiment is not limited to that illustrated in FIG. 6.

In FIG. 6, for example, although the example in which the three antennas 202 (x1) to 202 (x3) on the first face, the five antennas 202 (y1) to 202 (y5) on one second face, and the four antennas 202 (z1) to 202 (z4) on the other second face are installed is illustrated, the number of antennas installed on the first face and the second faces is not limited to the number in the example illustrated in FIG. 6, and may be an arbitrary number.

Figure 7:
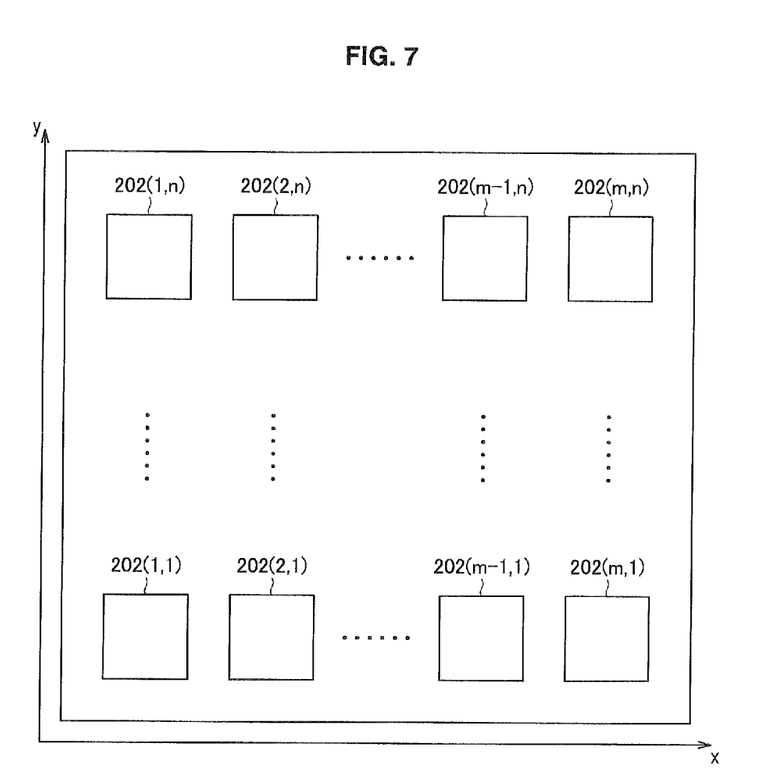
FIG. 7 is a descriptive diagram illustrating another example of a configuration of antennas included in the management device according to the embodiment.

In addition, FIG. 7 is a descriptive diagram illustrating another example of the configuration of the antennas 202 included in the management device 200 according to the present embodiment.

As illustrated in FIG. 7, for example, the antennas 202 installed on the first face and/or one or two or more second faces may be installed in a grid shape. Here, FIG. 7 illustrates an example in which m×n (m and n are each a positive integer) antennas 202 are installed in a grid shape.

Referring to FIG. 6 again, an example of the configuration of the management device according to the present embodiment will be described. The communication unit 204 transmits transmission requests according to the present embodiment via the antennas, and receives identification information transferred from the antennas. Here, as the communication unit 204, for example, a reader-writer (or an interrogator) based on the NFC or the RFID scheme is exemplified.

The control unit 206 is configured with, for example, an MPU (Micro Processing Unit), various processing circuits, or the like, and plays a role of controlling the entire management device 200. In addition, the control unit 206 includes, for example the position specification unit 220 and a recording control unit 222, playing a leading role of performing the process of the management method according to the present embodiment.

The position specification unit 220 plays a leading role of performing the position specification process of the management method according to the present embodiment, and identifies the position of an object O based on identification information which is, for example, received and acquired by the communication unit 204 from the plurality of antennas.

The recording control unit 222 records position information indicating the position of an object identified by the position specification unit 220 on a recording medium. In addition, the time at which the position is identified may be recorded in the position information according to the present embodiment in association with the identified position. Here, the position information according to the present embodiment corresponds to, for example log data of the result of the specification of the position.

When the management device according to the present embodiment includes the recording control unit 222, the management device according to the present embodiment can further perform the process of recording the position information indicating the position of the object identified in the position specification process by the position specification unit 220 on the recording medium as the process of the management method according to the present embodiment. As the position information is recorded on the recording medium, a user of the management device 20 can check the position of the object O later, for example, with reference to the position information stored in the recording medium.

In addition, as the recording medium on which the recording control unit 222 records the position information, for example, the storage unit 210 is exemplified, however, the recording medium on which the recording control unit 222 records the position information is not limited thereto. For example, the recording control unit 222 may record the position information on a connected external recording medium, or in an external device such as a server with which it can communicate via a network (or in a direct manner).

The control unit 206 leads the process (for example, the position specification process) of the management method according to the present embodiment with, for example, the position specification unit 220 and the recording control unit 222 included therein.

Note that, the configuration of the control unit according to the present embodiment is not limited to that illustrated in FIG. 6. For example, the control unit according to the present embodiment may not include the recording control unit 222. Even when the recording control unit 222 is not included, the control unit according to the present embodiment can perform the position specification process according to the management method according to the present embodiment. Thus, even when the recording control unit 222 is not included, the control unit according to the present embodiment can identify the position of the object O (object whose position is to be identified).

The switch units 208A to 208D connect the antennas corresponding to any face of the first face and one or two or more second faces and the communication unit 204. The switch units 208A to 208D are configured with arbitrary switch circuits such as switch circuits configured with, for example, FETs (Field Effect Transistors) or arbitrary switch elements. In addition, switching of connection in the switch units 208A to 208D is controlled by, for example, the control unit 206.

Here, the switch unit 208A plays a role of connecting the "communication unit 204" and the "antennas 202 in any face of the first face (face defined by the x axis and the y axis illustrated in FIG. 6; hereinafter the same as in FIG. 6), one second face (face defined by the y axis and the z axis illustrated in FIG. 6; hereinafter the same as in FIG. 6), and the other second face (face defined by the x axis and the z axis illustrated in FIG. 6; hereinafter the same as in FIG. 6)." In addition, the switch unit 208B plays a role of connecting the "switch unit 208A" and "any antenna 202 of the antennas 202 (x1) to 202 (x3) installed on the first face." In addition, the switch unit 208C plays a role of connecting the "switch unit 208A" and "any antenna 202 of the antennas 202 (y1) to 202 (y5) installed on one second face." In addition, the switch unit 208D plays a role of connecting the "switch unit 208A" and "any antenna 202 of the antennas 202 (z1) to 202 (z4) installed on the other second face."

The management device 200 connects the antennas corresponding to any face of the first face, or one or two or more second faces and the communication unit 204 using, for example, the four switch units which are the switch units 208A to 208D included therein.

Note that the management device according to the present embodiment is not limited to the configuration in which the four switch units are included as illustrated in FIG. 6. For example, the management device according to the present embodiment can connect the antennas corresponding to any face of the first face, or one or two or more second faces and the communication unit 204 by including one or two or more switch units.

The storage unit 210 is a storing section included in the management device 200 storing various kinds of data, for example, position information, applications, and the like. Here, as the storage unit 210, for example, a magnetic recording medium such as a hard disk, a non-volatile memory such as a flash memory, or the like is exemplified. In addition, the storage unit (not illustrated) may be attachable to or detachable from the management device 200.

The management device 200 performs the process (for example, the position specification process) of the management method according to the present embodiment in, for example, the configuration illustrated in FIG. 6.

In the example illustrated in FIG. 6, the plurality of antennas 202 are installed on each of the first face, one second face, and the other second face, and the management device 200 connects one antenna 202 among the antennas 202 and the communication unit 204. When the antenna 202 (x1) is connected to the communication unit 204, for example, and identification information corresponding to a certain object O is acquired, the management device 200 can identify that, for example, the object O is present in a position of which the x coordinate is "1." In addition, when identification information is acquired from each of the antennas 202 by connecting the antennas 202 installed on each of the first face, one second face, and the other second face to the communication unit 204 using the switch units 208, the coordinates of one or two or more objects O that are present can be pinpointed.

Thus, the management device 200 can identify the position of the object O (object of which the position is to be identified) with the configuration illustrated in, for example, FIG. 6.

In addition, when the management device 200 is applied to inventory management or clearance of a warehouse, for example, a worker who executes the inventory management or the clearance of a warehouse can understand where a target article is placed without going to the position of every article to make sure. Thus, when the management device 200 is applied to inventory management or clearance of a warehouse, the management device 200 can improve convenience and work efficiency of inventory management or clearance of a warehouse.

Note that the configuration of the management device according to the present embodiment is not limited to the configuration illustrated in FIG. 6

[1] First Modified Example of the Management Device According to the Present Embodiment Although FIG. 6 illustrates the example in which, for example, the management device according to the present embodiment has the antennas 202 installed on each of the first face, one second face, and the other second face, terminals may be installed on some or all of the first face, one second face, and the other second face. When the terminals are installed on some of the first face, one second face, and the other second face, the management device according to a first modified example identifies the position of an object O (object of which the position is to be identified) based on identification information acquired from any antenna or terminal. In addition, when the terminals are installed on all of the first face, one second face, and the other second face, the management device according to the first modified example identifies the position of the object (object of which the position is to be identified) based on identification information acquired from any terminal.

Here, as the terminals installed on some or all of the first face, one second face, and the other second face, for example, conductive members such as electrodes, metal, or the like are used as the first terminals 108 and the second terminals 110 included in the object O according to the present embodiment.

When terminals are installed on some or all of the first face, one second face, and the other second face, a switch unit according to the first modified example connects any antenna and/or any terminal corresponding to any of the first face, and one or two or more second faces and the communication unit 204. In addition, when terminals are installed on some or all of the first face, one second face, and the other second face, a communication unit according to the first modified example transmits a transmission request via an antenna and/or a terminal, and receives identification information transferred from an antenna and/or a terminal. In addition, when terminals are installed on some or all of the first face, one second face, and the other second face, a position specification unit according to the first modified example identifies the position of an object O (object of which the position is to be identified) based on identification information acquired from a plurality of antennas, a plurality of terminals, or antennas and terminals.

Therefore, the management device according to the first modified example can exhibit the same effect as the management device 200 illustrated in FIG. 6.

[2] Second Modified Example of the Management Device According to the Present Embodiment In addition, the management device according to the present embodiment may be configured such that, for example, antennas and/or terminals are installed on at least one of the first face, and one or two or more second faces. Even when antennas and/or terminals are installed on at least one of the first face, and one or two or more second faces, the management device according to a second modified example can perform a process (for example, the position specification process) of the management method according to the present embodiment based on, for example, identification information acquired from the installed antennas and/or terminals.

Thus, the management device according to the second modified example can identify the position of an object O (object of which the position is to be identified). In addition, when the management device according to the second modified example is applied to inventory management or clearance of a warehouse, the management device according to the second modified example can improve convenience and work efficiency in the inventory management or the clearance of a warehouse the same as the management device 200 illustrated in FIG. 6.

[3] Third Modified Example of the Management Device According to the Present Embodiment In addition, for example, the management device according to the present embodiment may be configured not to include some or all of the antennas 202 installed on the first face, and one or two or more second faces as illustrated in FIG. 6, the communication unit 204, the switch unit 208, and the storage unit 210. Even if some or all of the antennas 202 installed on the first face, and one or two or more second faces as illustrated in FIG. 6, the communication unit 204, the switch unit 208, and the storage unit 210 are configured not to be included, the management device according to a third modified example can perform the process (for example, the position specification process) of the management method according to the present embodiment.

Thus, the management device according to the third embodiment can exhibit the same effect as the management device 200 illustrated in FIG. 6.

[4] Fourth Modified Example of the Management Device According to the Present Embodiment In addition, for example, the management device according to the present embodiment may further include an object O (object of which the position is to be identified). Even if the object O is further included, the management device according to a fourth modified example can identify the position of the included object O by performing the process (for example, the position specification process) of the management method according to the present embodiment in the same manner as the management device 200 illustrated in FIG. 6.

Thus, the management device according to the fourth modified example can exhibit the same effect as the management device 200 illustrated in FIG. 6.

[5] Fifth Modified Example of the Management Device According to the Present Embodiment In addition, for example, the management device according to the present embodiment can include the position specification unit 220 and the recording control unit 222 illustrated in FIG. 6 separately (which, for example, are realized as individual processing circuits). In addition, as described above, the management device according to the present embodiment may be configured not to include the recording control unit 222 illustrated in FIG. 6 as described above.

[6] Sixth Modified Example of the Management Device According to the Present Embodiment In addition, for example, although FIG. 6 shows a configuration in which one communication unit 204 is included, the management device according to the present embodiment may include one or two or more communication units on each of the first face or the second faces. Here, as an example in which a plurality of communication units are included on each of the first face and the second faces, for example, spreading reader-writers (an example of the communication unit) on a floor (an example of the first face) and a wall (an example of a second face) is exemplified.

[7] Seventh Modified Example of the Management Device According to the Present Embodiment The management device according to the present embodiment can also have a configuration in which, for example, one or two or more modified examples among the configurations according to the first to the sixth modified examples are combined.

Hereinabove, the present embodiment has been described exemplifying the management device, however, the present embodiment is not limited thereto. The present embodiment can be applied to various devices and systems, for example, computers including PCs (Personal Computers), servers, and the like and article management systems including systems pertaining to warehouses used for storing and managing articles, and the like. In addition, the present embodiment can also be applied to, for example, devices as described above and processing ICs that can be incorporated into devices constituting systems described above.

(Program According to the Present Embodiment)

By executing a program for causing a computer to function as the management device according to the present embodiment (for example, a program that can execute the process of the management method according to the present embodiment such as the position specification process) in the computer, the position of an object of which the position is to be identified can be identified.

Hereinabove, the preferred embodiments of the present technology have been described in detail with reference to the accompanying drawings, however, the technical scope of the present technology is not limited thereto. It should be understood by those skilled in the art that various modifications, combinations, sub-combinations and alterations may occur depending on design requirements and other factors insofar as they are within the scope of the appended claims or the equivalents thereof.

For example, although the provision of the program for causing a computer to function as the management device according to the present embodiment (computer program) is described above, in the present embodiment, a recording medium in which the program is stored can also be provided.

The configurations described above are mere examples of the present embodiment, and of course belong to the technical scope of the present technology.

Additionally, the present technology may also be configured as below.

(1) A management device including:
a position identification unit that identifies, based on identification information that is acquired from a plurality of antennas, a plurality of terminals, or antennas and terminals and indicates an object, a position of the object that stores the identification information,
wherein a distance between the antennas, a distance between the terminals, or a distance between the antennas and the terminals is a distance at which no mutual interference occurs.

(2) The management device according to (1), wherein the antennas or the terminals from which the identification information is acquired are installed on a first face that is a face in a direction in which gravity is applied to the object and on which the object is placed.

(3) The management device according to (2), further including:
a communication unit that transmits a transmission request for causing the object to transmit the identification information via the antennas and/or the terminals, and receives the identification information transferred from the antennas and/or the terminals,
wherein the position identification unit identifies the position of the object based on the identification information that the communication unit receives.

(4) The management device according to (3), wherein, via the antennas and/or the terminals, the transmission request and the identification information are transmitted from the first face in a vertical direction.

(5) The management device according to any one of (2) to (4), wherein the antennas or the terminals from which the identification information is acquired are installed on the first face in a grid shape.

(6) The management device according to (2), wherein the antennas or the terminals from which the identification information is acquired are further installed on one or two or more second faces located in a vertical direction to the first face.

(7) The management device according to (6), further including:
a communication unit that transmits a transmission request for causing the object to transmit the identification information via the antennas and/or the terminals, and receives the identification information transferred from the antennas and/or the terminals; and
a switch unit that connects the communication unit to any of the antennas and/or the terminals corresponding to any of the first face and the one or two or more second faces,
wherein the position identification unit identifies the position of the object based on the identification information that the communication unit receives.

(8) The management device according to (7), wherein, via the antennas and/or the terminals installed on each of the first face and the one or two or more second faces, the transmission request and the identification information are transmitted from installation faces in a vertical direction.

(9) The management device according to any one of (1) to (8), further including:
a recording control unit that records position information indicating the position of the object identified by the position identification unit on a recording medium.

(10) The management device according to any one of (1) to (9), further including:
the object.

(11) The management device according to (10), wherein the object includes
a first antenna that performs transmission and reception of a signal in a non-contact manner,
a second antenna that performs transmission and reception of a signal in a non-contact manner,
a transmission line that connects the first antenna and the second antenna, and
a processing unit that stores the identification information and transmits the identification information to the second antenna when a transmission request that is transmitted from the second antenna for causing the object to transmit the identification information is received.

(12) The management device according to (10), wherein the object includes
a first terminal that performs transmission and reception of a signal in a contact manner,
a second terminal that performs transmission and reception of a signal in a contact manner, a transmission line that connects the first terminal and the second terminal, and
a processing unit that stores the identification information and transmits the identification information to the transmission line when a transmission request for causing the object to transmit the identification information is transferred from the connected transmission line.

(13) The management device according to any one of (10) to (12), wherein the object is a containing body that is capable of containing another object.

(14) A management method including:

identifying, based on identification information that is acquired from a plurality of antennas, a plurality of terminals, or antennas and terminals and indicates an object, a position of the object that stores the identification information, wherein a distance between the antennas, a distance between the terminals, or a distance between the antennas and the terminals is a distance at which no mutual interference occurs.

(15) The management method according to (14), wherein the antennas or the terminals from which the identification information is acquired are installed on a first face that is a face in a direction in which gravity is applied to the object and on which the object is placed.

(16) The management method according to (15), further including:

transmitting a transmission request for causing the object to transmit the identification information via the antennas and/or the terminals, and receiving the identification information transferred from the antennas and/or the terminals, wherein, in the step of identifying the position of the object that stores the identification information, the position of the object is identified based on the identification information received in the step of receiving the identification information.

(17) The management method according to (16), wherein, via the antennas and/or the terminals, the transmission request and the identification information are transmitted from the first face in a vertical direction.

(18) The management method according to any one of (15) to (17), wherein the antennas or the terminals from which the identification information is acquired are installed on the first face in a grid shape.

(19) The management method according to (15), wherein the antennas or the terminals from which the identification information is acquired are further installed on one or two or more second faces located in a vertical direction to the first face.

(20) The management method according to (14), further including:

recording position information indicating the position of the object identified in the step of identifying the position of the object that stores the identification information on a recording medium.

The present disclosure contains subject matter related to that disclosed in Japanese Priority Patent Application JP 2012-229644 filed in the Japan Patent Office on Oct. 17, 2012, the entire content of which is hereby incorporated by reference.

What is claimed is:

1. A management device comprising:
    a position identification unit that identifies a position of an object based on identification information,
    wherein the identification information indicates the object, is stored by the object, and is acquired from a plurality of antennas, a plurality of terminals, or both the plurality of antennas and the plurality of terminals,
    wherein a distance between respective antennas of the plurality of antennas, a distance between respective terminals of the plurality of terminals, or a distance between respective antennas of the plurality of antennas and respective terminals of the plurality of terminals is a distance at which no mutual electromagnetic interference occurs.

2. The management device according to claim 1, wherein the plurality of antennas or the plurality of terminals from which the identification information is acquired is installed on a first surface,
    wherein the first surface is transverse to a direction in which gravity is applied to the object and is a surface on which the object is placed.

3. The management device according to claim 2, further comprising:
    a communication unit that transmits a transmission request for causing the object to transmit the identification information via the plurality of antennas and/or the plurality of terminals, and receives the identification information transferred from the plurality of antennas and/or the plurality of terminals,
    wherein the position identification unit identifies the position of the object based on the identification information that the communication unit receives.

4. The management device according to claim 3, wherein, via the plurality of antennas and/or the plurality of terminals, the transmission request and the identification information are transmitted from the first surface in a vertical direction.

5. The management device according to claim 2, wherein the plurality of antennas or the plurality of terminals from which the identification information is acquired is installed on the first surface in a grid shape.

6. The management device according to claim 2, wherein the plurality of antennas or the plurality of terminals from which the identification information is acquired is further installed on one or two or more second surfaces,
    wherein at least one of the one or two or more second surfaces is transverse to the first surface.

7. The management device according to claim 6, further comprising:
    a communication unit that transmits a transmission request for causing the object to transmit the identification information via the plurality of antennas and/or the plurality of terminals, and receives the identification information transferred from the plurality of antennas and/or the plurality of terminals; and
    a switch unit that connects the communication unit to any of the plurality of antennas and/or the plurality of terminals corresponding to any of the first surface and the one or two or more second surfaces,
    wherein the position identification unit identifies the position of the object based on the identification information that the communication unit receives.

8. The management device according to claim 7, wherein, via the plurality of antennas and/or the plurality of terminals installed on each of the first surface and the one or two or more second surfaces, the transmission request and the identification information are transmitted from installation surfaces in a vertical direction.

9. The management device according to claim 1, further comprising:
    a recording control unit that records position information indicating the position of the object identified by the position identification unit on a recording medium.

10. The management device according to claim 1, further comprising:
    the object.

11. The management device according to claim 10, wherein the object includes
    a first antenna that performs transmission and reception of a signal in a non-contact manner,
    a second antenna that performs transmission and reception of a signal in a non-contact manner, a transmission line that connects the first antenna and the second antenna, and a processing unit that stores the identification information and transmits the identification information to the second antenna when a transmission request that is transmitted from the second antenna for causing the object to transmit the identification information is received.

12. The management device according to claim 10, wherein the object includes a first terminal that performs transmission and reception of a signal in a contact manner, a second terminal that performs transmission and reception of a signal in a contact manner, a transmission line that connects the first terminal and the second terminal, and a processing unit that stores the identification information and transmits the identification information to the transmission line when a transmission request for causing the object to transmit the identification information is transferred from the connected transmission line.

13. The management device according to claim 10, wherein the object is a containing body that is capable of containing another object.

14. A management method comprising:

identifying a position of an object based on identification information, wherein the identification information indicates the object, is stored by the object, and is acquired from a plurality of antennas, a plurality of terminals, or both the plurality of antennas and the plurality of terminals, wherein a distance between respective antennas of the plurality of antennas, a distance between respective terminals of the plurality of terminals, or a distance between respective antennas of the plurality of antennas and respective terminals of the plurality of terminals is a distance at which no mutual electromagnetic interference occurs.

15. The management method according to claim 14, wherein the plurality of antennas or the plurality of terminals from which the identification information is acquired is installed on a first surface, wherein the first surface is transverse to a direction in which gravity is applied to the object and is a surface on which the object is placed.

16. The management method according to claim 15, further comprising:

transmitting a transmission request for causing the object to transmit the identification information via the plurality of antennas and/or the plurality of terminals, and receiving the identification information transferred from the plurality of antennas and/or the plurality of terminals, wherein, in identifying the position of the object that stores the identification information, the position of the object is identified based on the identification information received in receiving the identification information.

17. The management method according to claim 16, wherein, via the plurality of antennas and/or the plurality of terminals, the transmission request and the identification information are transmitted from the first surface in a vertical direction.

18. The management method according to claim 15, wherein the plurality of antennas or the plurality of terminals from which the identification information is acquired is installed on the first surface in a grid shape.

19. The management method according to claim 15, wherein the plurality of antennas or the plurality of terminals from which the identification information is acquired is further installed on one or two or more second surfaces, wherein at least one of the one or two or more second surfaces is transverse to the first surface.

20. The management method according to claim 14, further comprising:

recording position information indicating the position of the object identified in identifying the position of the object that stores the identification information on a recording medium.

* * * * *